Figure 1:
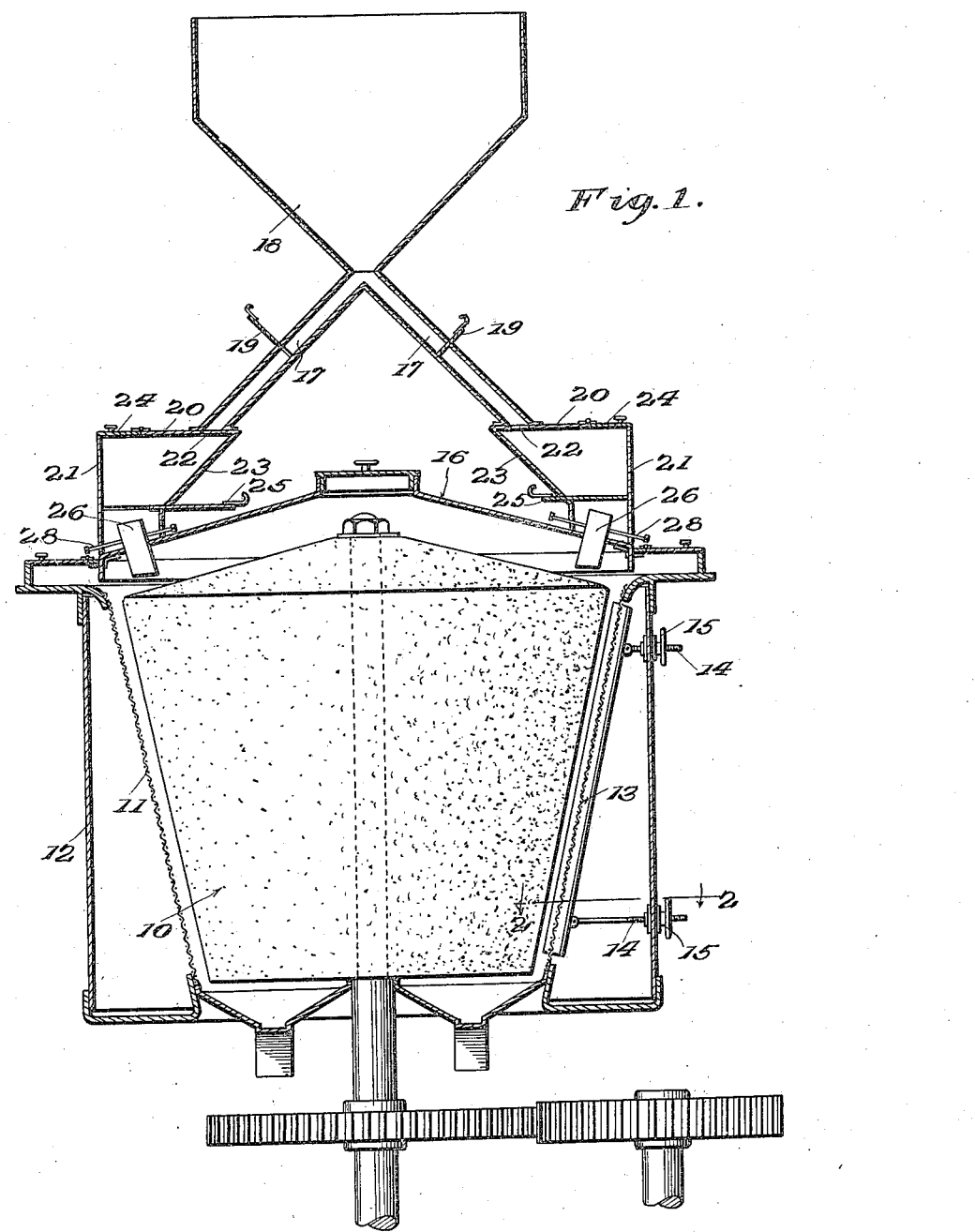

F. E. GIOZZA.
AUTOMATIC FEED DEVICE FOR PEARLING CONES.
APPLICATION FILED MAR. 28, 1921.

1,424,638.

Patented Aug. 1, 1922.
2 SHEETS—SHEET 1.

WITNESSES
W. A. Williams

INVENTOR
F. E. Giozza
BY
ATTORNEYS

F. E. GIOZZA.
AUTOMATIC FEED DEVICE FOR PEARLING CONES.
APPLICATION FILED MAR. 28, 1921.
1,424,638.
Patented Aug. 1, 1922.
2 SHEETS—SHEET 2.
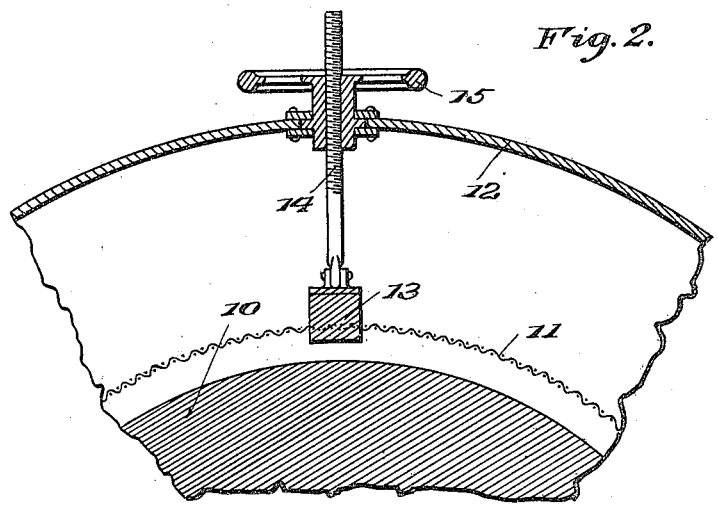
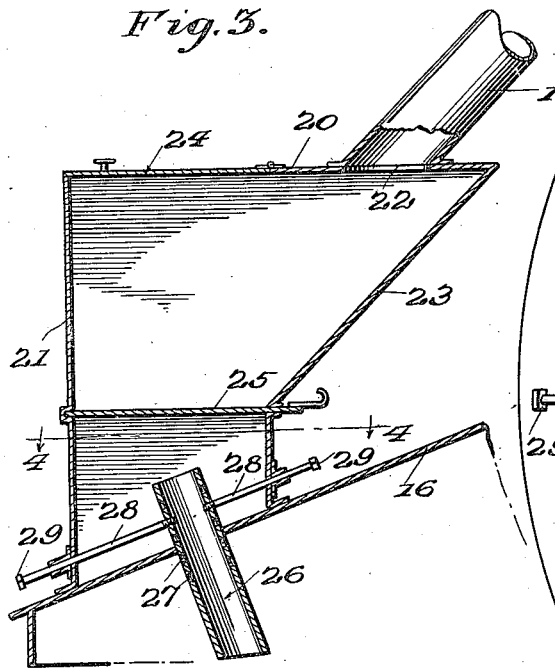
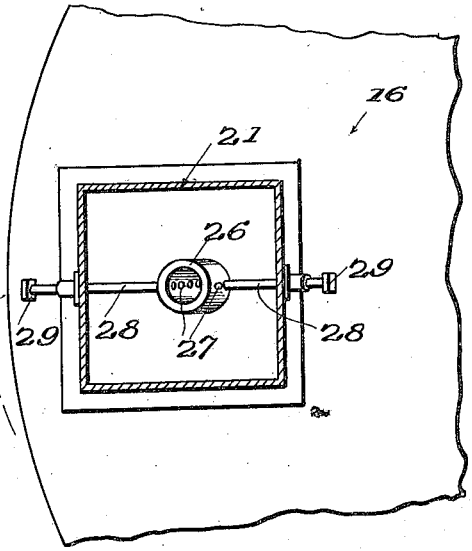
WITNESSES
W. A. Williams
INVENTOR
F. E. Giozza
BY
ATTORNEYS

UNITED STATES PATENT OFFICE.

FRANK E. GIOZZA, OF NEW ORLEANS, LOUISIANA.

AUTOMATIC FEED DEVICE FOR PEARLING CONES.

1,424,638.  Specification of Letters Patent.  Patented Aug. 1, 1922.

Application filed March 28, 1921. Serial No. 456,089.

*To all whom it may concern:*

Be it known that I, FRANK E. GIOZZA, a citizen of the United States, and a resident of New Orleans, in the parish of Orleans and State of Louisiana, have invented certain new and useful Improvements in Automatic Feed Devices for Pearling Cones, of which the following is a specification.

My present invention relates generally to machines and devices for scouring or pearling rice, oats and the like, and more particularly to a feeding device for machines of this type known as pearling cones, my object being the provision of a feed device which will bring about automatic action and a uniform feed and in this way increase output and general effectiveness of the pearling operation and eliminate interruptions as well as cracking and breaking of the grain.

More particularly my present invention aims to provide means feeding grain to the rim of a pearling cone instead of to the center as most common, the means employed providing for a free unobstructed feed under proper working conditions and an automatic check of feed and relief of feed pressure when the level of grain exceeds a desired point.

With these and other objects in mind my invention resides in the features of construction, arrangement and operation of parts to be now described with respect to the accompanying drawings, forming a part of this specification, and wherein, Figure 1 is a vertical sectional view through a pearling cone and my improved feeder in connection therewith, Figure 2 is a detail horizontal section taken on line 2—2 of Figure 1, Figure 3 is an enlarged vertical section through one of the feed boxes, and Figure 4 is a horizontal section taken substantially on line 4—4 of Figure 3.

Referring now to these figures I have shown a pearling cone at 10 in Figure 1, rotatable as usual within the conical reticulate inner wall 11 of a casing 12, which reticulate wall is flexible to some extent at least and has at one point an upright brake member 13 controlled by threaded adjusting rods 14 and hand wheels 15, each of the latter being rotatably mounted in connection with the casing wall as seen particularly in Figure 2.

The cone 10 has a top plate 16 spaced thereabove in connection with the upper portion of the casing 12, through which the grain, rice, oats and the like is usually fed at the center.

My invention contemplates the feed of grain to the top plate 16 adjacent to the rim thereof and the rim of the cone 10, and as shown in Figure 1, this may be carried out by feeds at diametrically opposite points, through feed spouts 17 diverging from the lower portion of a grain hopper 18, and each provided with a cut off 19.

The lower end of each of the feed spouts 17 connects with the top wall 20 of a feed box 21, and opens into the upper portion of the feed box through an opening 22 in said top wall adjacent to one side wall of the box which is inclined as shown at 23 approximately parallel with the spout 17. The top wall 20 of each feed box preferably has a hinged section 24 forming a cover through which access may be readily had to the interior of the feed box and each feed box is also provided between its upper and lower ends with a cut off slide 25 operable from the exterior of the feed box to control the flow of grain downwardly upon the inner surface of the inclined wall 23.

The lower end of each feed box is open and is connected to a portion of the top plate 16 adjacent to the rim of the latter and around an opening therethrough receiving a feed tube 26 whose lower end opens into the casing 12 above the rim of the pearling cone 10 and whose upper end opens into the feed box 21 as best seen in Figure 3. Each feed tube 26 is moreover vertically adjustable and has lengthwise series of threaded apertures 27 in its wall receiving the inner ends of rods 28. These rods have bearing through opposite walls of the feed box 21 and are provided with outer headed ends 29 so that they may be readily rotated to screw into and out of the feed tube openings 27.

In operation either one or both of the feed boxes may be used, grain within the hopper 18 falling through the chutes 17 and downwardly upon the inclined wall 23 of each feed box more or less under control of the cut off slides 25. Such grain finds its way into the upper end of the feed tube 26 of each feed box and downwardly through said feed tube onto the pearling cone adjacent to the rim of the latter, and it is quite obvious that when in the accumulation of the grain upon the feed cone its level reaches the lower end of the feed tube, further feed is automatically cut off and at the same time the weight of the grain in the feed device is relieved so that there can be a normal fall of grain through the pearling cone, avoiding all danger of clogging and at the same time increasing effectiveness and production with a material decrease in the proportion of cracked or split grains.

In fitting the feed device to a particular pearling cone in the first instance it is of course necessary to properly adjust the feed tubes 26 to accord with the spacing between the top plate 16 and the pearling cone 10, but after this initial adjustment is made it is rarely necessary to readjust unless it is desired to change the necessary height of the grain above the cone.

It is therefore obvious that my invention obviates all necessity for constant manual control of the feed of grain as is required in the machines now in use and which on this account choke up from time to time necessitating shut downs.

My invention also avoids the lack of uniformity in the feed which is impossible to avoid in the manually controlled machines now in use and which ordinarily requires a more powerful driving means than my improved device with its uniform feed will necessitate.

My invention thus provides a feed device which will be highly effective for the purposes intended, and one which is simple, strong and durable in character.

I claim:

In a device for feeding dry material by gravity onto a horizontally rotating surface within a machine having a top plate spaced above said surface, said device including a feed box seated on the top plate and having an upper intake, an upright tubular discharge member for the feed box shiftable in the direction of its length through an opening in the said top plate, said discharge member opening at its upper end into the feed box and at its lower end below the top plate and having lengthwise series of apertures in its upper portion within the feed box, and supporting rods extending through opposite side walls of the feed box above the top plate and into selected threaded apertures of the discharge member whereby to support the lower end of the latter in selectively spaced relation to the said rotating surface onto which it discharges.

FRANK E. GIOZZA.